United States Patent
Barak

[11] Patent Number: 5,963,372
[45] Date of Patent: Oct. 5, 1999

[54] OPTICAL POLARIZER

[75] Inventor: Shlomo Barak, Rishon le Zion, Israel

[73] Assignee: Unic View Ltd., Netanya, Israel

[21] Appl. No.: 09/124,953

[22] Filed: Jul. 29, 1998

[51] Int. Cl.$^6$ .................................................... G02B 5/30
[52] U.S. Cl. .......................... 359/488; 359/495; 359/496; 349/194
[58] Field of Search ..................................... 359/494, 495, 359/496, 485, 500, 497, 488; 362/19; 353/8, 20; 349/194, 167

[56] References Cited

U.S. PATENT DOCUMENTS

| | | | |
|---|---|---|---|
| 3,612,652 | 10/1971 | Habegger | 359/488 |
| 3,677,621 | 7/1972 | Smith | 350/157 |
| 5,042,925 | 8/1991 | Broer et al. | 359/37 |

*Primary Examiner*—Cassandra Spyrou
*Assistant Examiner*—Fayez Assaf
*Attorney, Agent, or Firm*—Abelman, Frayne & Schwab

[57] ABSTRACT

An optical polarizer including a polarizing beam splitter including first and second transparent elements separated by a layer of a birefringent material, the layer of the birefringent material being operative to change the polarity of light passing therethrough, the polarizing beam splitter being operative to receive a beam of unpolarized light at the first transparent element, to cause a first beam of light of a first polarity to undergo total internal reflection at an interface between the first transparent element and the layer of birefringent material and to pass a second beam of light of a second polarity through the layer of birefringent material, thus changing its polarity to the first polarity, a first reflector associated with a quarter wave plate and being arranged to receive the first beam of light of a first polarity reflected from the interface between the first transparent element and the layer of a birefringent material via the first transparent element and to change the polarity of the light to a second polarity and a second reflector arranged to receive the first beam of light directed by the first reflector through the quarter wave plate, the first transparent element, the layer of birefringent material and the second transparent element, the polarity of the first beam of light having been changed twice, once by the quarter wave plate and again by passing through the layer of birefringent material, and thus being of the first polarity, the second reflector directing the first beam of light of the first polarity through the second transparent element towards an interface between the second transparent element and the layer of birefringent material such that it undergoes total internal reflection thereat and is combined with the light of the first polarity into a single beam.

6 Claims, 1 Drawing Sheet

OPTICAL POLARIZER

FIELD OF THE INVENTION

The present invention relates to optical polarizers generally.

BACKGROUND OF THE INVENTION

Conventional optical polarizers operate by absorbing light of one polarity while transmitting light of another polarity. Thus, they generally have less than about 50% efficiency. There are also known more efficient polarizers which split light of different polarities into separate beams and provide a multibeam output of light having a single polarity. These polarizers have an efficiency close to 100%.

SUMMARY OF THE INVENTION

The present invention seeks to provide an efficient optical polarizer which provides a single output beam of light having a single polarity with high purity.

There is thus provided in accordance with a preferred embodiment of the present invention an optical polarizer including:

a polarizing beam splitter including first and second transparent elements separated by a layer of a birefringent material, the layer of the birefringent material being operative to change the polarity of light passing therethrough, the polarizing beam splitter being operative to receive a beam of unpolarized light at the first transparent element, to cause a first beam of light of a first polarity to undergo total internal reflection at an interface between the first transparent element and the layer of birefringent material and to pass a second beam of light of a second polarity through the layer of birefringent material, thus changing its polarity to the first polarity, a first reflector associated with a quarter wave plate and being arranged to receive the first beam of light of a first polarity reflected from the interface between the first transparent element and the layer of a birefringent material via the first transparent element and to change the polarity of the light to a second polarity; and a second reflector arranged to receive the first beam of light directed by the first reflector through the quarter wave plate, the first transparent element, the layer of birefringent material and the second transparent element, the polarity of the first beam of light having been changed twice, once by the quarter wave plate and again by passing through the layer of birefringent material, and thus being of the first polarity, the second reflector directing the first beam of light of the first polarity through the second transparent element towards an interface between the second transparent element and the layer of birefringent material such that it undergoes total internal reflection thereat and is combined with the light of the first polarity into a single beam.

BRIEF DESCRIPTION OF THE DRAWING

The present invention will be understood and appreciated more fully from the following detailed description, taken in conjunction with the drawing in which.

DETAILED DESCRIPTION OF A PREFERRED EMBODIMENT

Figure 1:
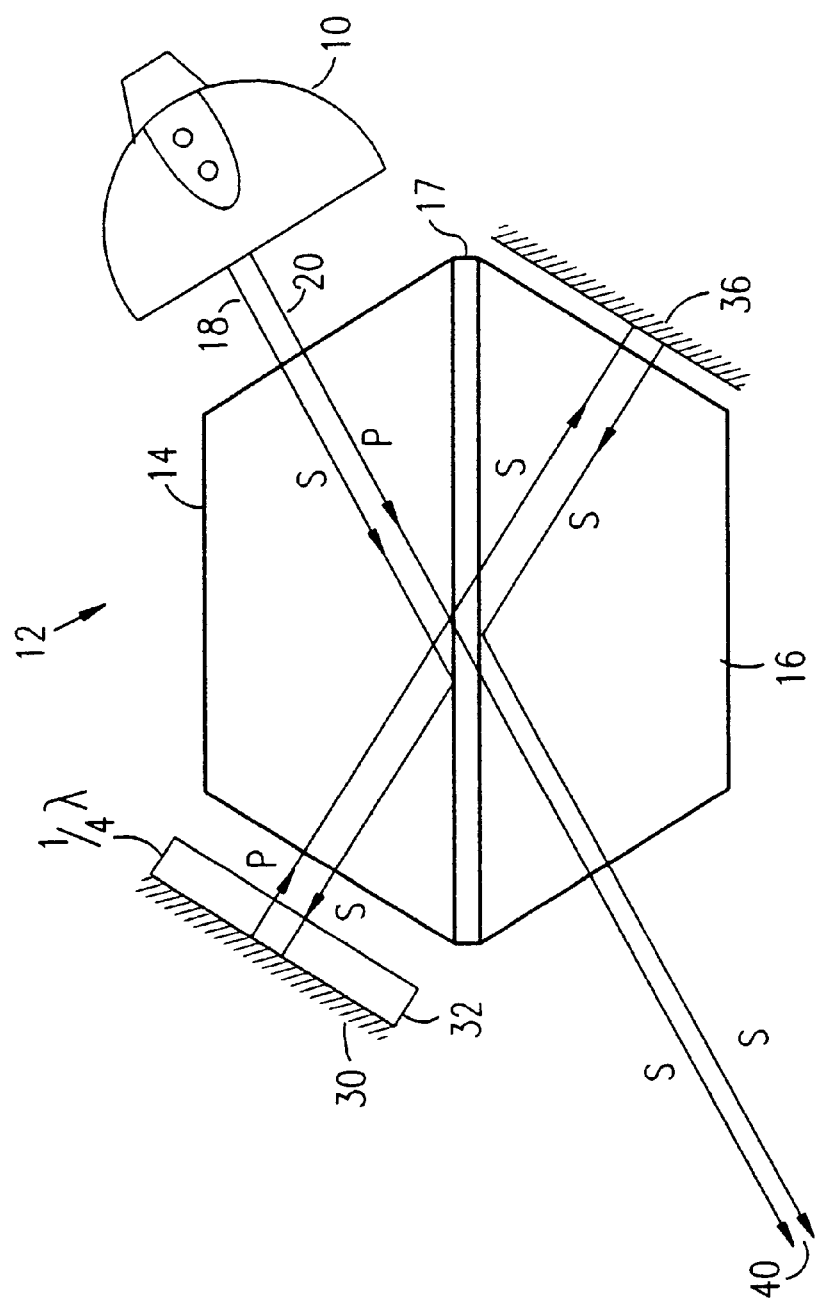
FIG. 1 is simplified pictorial illustration of an optical polarizer constructed and operative in accordance with a preferred embodiment of the present invention.

Reference is now made to FIG. 1, which illustrates an optical polarizer constructed and operative in accordance with a preferred embodiment of the present invention. The optical polarizer preferably receives light from a light source 10 which provides a beam of non-polarized light to a polarizing beam splitter 12 including first and second prisms 14 and 16 separated by a layer 17 of birefringent material, such as a liquid crystal material or a birefringent oriented polymer. Examples of such materials are described in U.S. Pat. No. 5,042,925, the disclosure of which is hereby incorporated by reference.

The polarizing beam splitter 12 is operative to split non-polarized light impinging thereon from light source 10 into two preferably differently polarized beams, 18 and 20. Beam 18 undergoes total internal reflection at the interface between prism 14 and layer 17 and beam 20 passes therethrough. The layer 17 of the birefringent material is operative to change the polarity of beam 20 passing therethrough.

The polarizing beam splitter may thus be understood to be operative to receive a beam of unpolarized light at the first prism 14, to cause the first beam of light 18 of a first polarity to undergo total internal reflection at the interface between the prism 14 and the layer 17 of birefringent material and to pass a second beam of light 20 of a second polarity through the layer 17 of birefringent material, thus changing its polarity to the first polarity.

A first reflector 30, associated with a quarter wave plate 32, is arranged to receive the first beam of light 18 of a first polarity reflected from the interface between the prism 14 and the layer 17 of a birefringent material via the prism 14 and to change the polarity of the light beam 18 to a second polarity.

A second reflector 36 is arranged to receive the first beam of light 18 directed by the first reflector 30 through the quarter wave plate 32, the prism 14, the layer 17 of birefringent material and the prism 16, the polarity of the first beam of light 18 having been changed twice, once by the quarter wave plate 32 and again by passing through the layer 17 of birefringent material, and thus being of the first polarity.

The second reflector 36 directs the first beam of light 18 of the first polarity through the prism 16 towards an interface between the prism 16 and the layer 17 of birefringent material such that beam 18 undergoes total internal reflection at that interface and is combined with light beam 20 of the first polarity into a single beam 40, of the first polarity.

It will be appreciated by persons skilled in the art that the present invention is not limited by what has been particularly shown and described hereinabove. Rather, the scope of the present invention also includes modifications and variations of the features described above which would occur to persons skilled in the art upon reading the foregoing description and which are not in the prior art.

I claim:

1. An optical polarizer including:

a polarizing beam splitter including first and second transparent elements separated by a layer of a birefringent material, the layer of the birefringent material being operative to change the polarity of light passing therethrough, the polarizing beam splitter being operative to receive a beam of unpolarized light at the first transparent element, to cause a first beam of light of a first polarity to undergo total internal reflection at an interface between the first transparent element and the layer of birefringent material and to pass a second beam of light of a second polarity through the layer of birefringent material, thus changing its polarity to the first polarity, a first reflector associated with a quarter wave plate and being arranged to receive the first beam of light of the first polarity reflected from the interface between the first transparent element and the layer of a birefringent material via the first transparent element and to change the polarity of the light to the second polarity; and a second reflector arranged to receive the first beam of light directed by the first reflector through the quarter wave plate, the first transparent element, the layer of birefringent material and the second transparent element, the polarity of the first beam of light having been changed twice, once by the quarter wave plate and again by passing through the layer of birefringent material, and thus being of the first polarity, the second reflector directing the first beam of light of the first polarity through the second transparent element towards an interface between the second transparent element and the layer of birefringent material such that the first beam undergoes total internal reflection thereat and is combined with the second beam of light the first polarity into a single beam.

2. An optical polarizer according to claim 1 and wherein said layer of birefringent material is a layer of liquid crystal material.

3. An optical polarizer according to claim 1 and wherein said layer of birefringent material is a layer of a birefringent oriented polymer.

4. An optical polarizer according to claim 1 and wherein said first and second transparent elements comprise first and second prisms.

5. An optical polarizer according to claim 2 and wherein said first and second transparent elements comprise first and second prisms.

6. An optical polarizer according to claim 3 and wherein said first and second transparent elements comprise first and second prisms.

* * * * *